HENDERSON & FOWLE.
Car Starter.
No. 47,722.
Patented May 16, 1865.
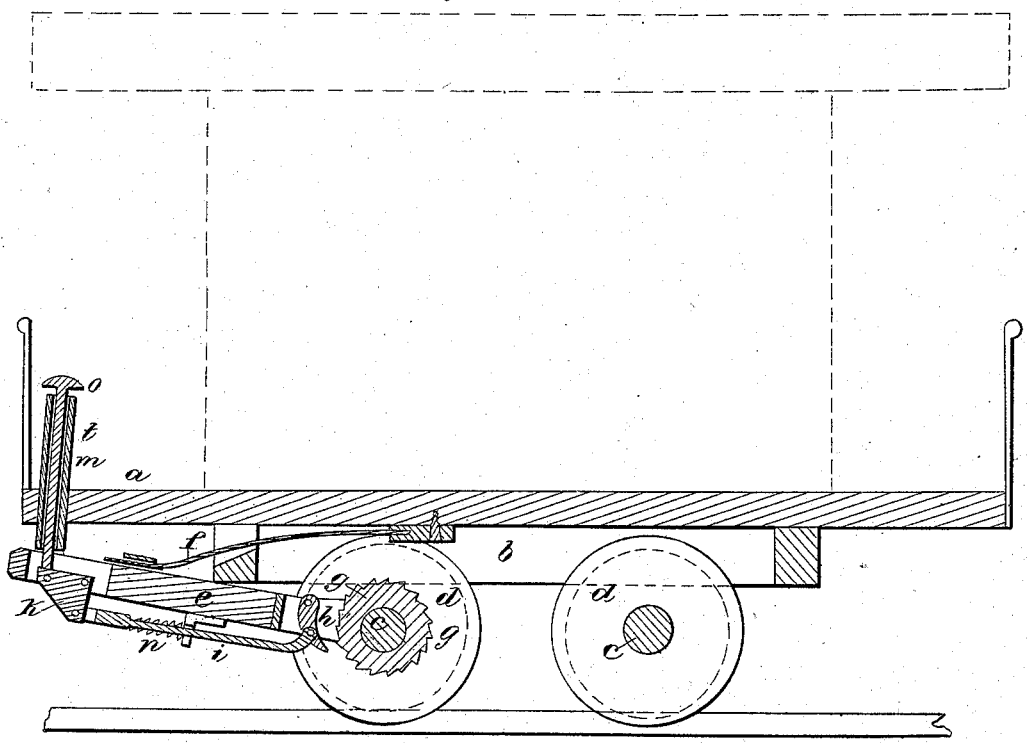
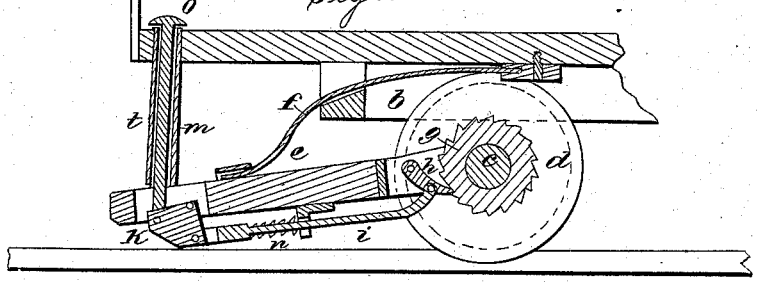
Witnesses
F. Fowle
W. B. Gleason
Inventors
Ro Henderson
J W Fowle
by their Atty W. B. Crosby

UNITED STATES PATENT OFFICE.

WILLIAM HENDERSON AND J. W. FOWLE, OF BOSTON, MASSACHUSETTS.

IMPROVEMENT IN STARTING HORSE-RAILWAY CARS.

Specification forming part of Letters Patent No. 47,722, dated May 16, 1865.

*To all whom it may concern:*

Be it known that we, WILLIAM HENDERSON and J. W. FOWLE, both of Boston, in the county of Suffolk and State of Massachusetts, have invented an Improvement in Starting Horse-Railway Cars; and we do hereby declare that the following, taken in connection with the drawings which accompany and form part of this specification, is a description of our invention sufficient to enable those skilled in the art to practice it.

It is well known that in starting cars from a state of rest upon horse-railways much injury occurs to the horses from the undue strain required, and it is a desideratum to overcome this difficulty by mechanism auxiliary to the running-gear of the car, which shall assist in overcoming the resistance. Various methods have been devised for this purpose. In some coiled springs are wound upon the axles by the momentum of the car when running, the power thus obtained being thus reserved to turn the wheels at starting. In others the pole of the car is so applied as to operate in connection with a ratchet mechanism in starting, the ratchet being placed upon the axle and a pawl attached to or connected with the pole, thus obtaining a leverage upon the axle to turn it slightly as the horses start; and still another method has been to apply a ratchet mechanism to be operated by the driver from the platform of the car.

Our invention relates to this latter method of operation; and it consists in the arrangement and combination of devices by which a ratchet fixed upon one of the car-axles may be continuously operated by the foot of the driver, and also in the peculiar mechanism for engaging and disengaging the ratchet-pawl.

The drawings show in section a car-platform and part of the truck with our invention embodied thereupon.

Figure 1 shows the ratchet or starting mechanism in its normal position, and Fig. 2 showing the ratchet-lever depressed and the pawl engaged with the ratchet.

*a* denotes the car-platform; *b*, the track; *c*, the axles, and *d* the wheels. *e* is an arm or lever hung upon one of the axles, and extending thence toward the adjacent end of the car. When the car is running, the forward end of this lever is held up by a lifting-spring, *f*, in the position seen in Fig. 1. The axle upon which the arm *e* is hung carries a ratchet, *g*, fixed upon and rotating with the axle, and the arm *e* has a pawl, *h*, which actuates the ratchet. A rod, *i*, is jointed to the pawl near its lower end, this rod running along under or upon one side of the arm *e*, and being jointed at its front end to a rocker-plate, *k*, hung upon the arm *e*, as seen in the drawings. This plate is jointed to a pedal rod, *l*, which extends up through the platform of the car, this rod being surrounded by a loose sleeve, *m*.

When the car is running, (and when it stops,) the mechanism is in the position seen in Fig. 1, a spring, *n*, (bearing at one end against a shoulder or projection on the rod *i* and at the other end against a projection from the lever *e*,) pressing the rod toward the front end of the car, and holding the pawl out of engagement with the teeth of the ratchet. This position of the rod maintains the pedal rod in its highest position, there being a space between the foot-piece *o* and the top of the sleeve. The parts being in this condition when the car stops, to start it the driver places his foot upon the piece *o* and depresses it. The spring *f*, which elevates the arm *e*, is of such strength relative to the strength of the spring *n* that the first effect of this depression is to depress the front end of the plate *k*, which presses forward the rod *i* and drives the pawl into engagement with the ratchet *g*. This brings the cap *o* down upon the cylinder or sleeve *m*, and the bottom of the sleeve in contact with the arm *e*, when the pressure exerted will come upon the arm *e*, and the continued depression of the rod *l* will carry the arm *e* into the position shown in Fig. 2, rotating the ratchet, and with it the wheels, as will be readily understood, and thus effecting the movement of the car.

Upon release of the piece *o* from pressure the springs *f* and *n* carry back the parts into the position shown in Fig. 1, when the operation may be repeated until the horses get fairly started.

It will be obvious that this arrangement is much simpler and more reliable than a mechanism acting by the power of a spring, or than a ratchet mechanism operated by the draft of the horses, as the operation can be continued until the car gets properly started. It is also more advantageous than a mechanism operated by hand, as it leaves the driver free to manage his horses with his hands, and to guide and start them simultaneously with the exertion of his force to actuate the lever to which the ratchet-pawl is hung.

We claim—

1. The combination of the ratchet-pawl, ratchet-lever, foot-rod, and lifting-spring when arranged to operate together substantially as set forth.

2. The combination of the rod $i$, spring $n$, socket-plate $k$, and rod $l$ for effecting the engagement and disengagement of the ratchet and pawl.

In witness whereof we have hereunto set our hands this 14th day of March, A. D. 1865.

WILLIAM HENDERSON.
JOSEPH W. FOWLE.

In presence of—
J. B. CROSBY,
F. GOULD.